(12) United States Patent
Elisseev et al.

(10) Patent No.: US 10,901,786 B2
(45) Date of Patent: Jan. 26, 2021

(54) TOOL FOR IDENTIFYING SOURCES OF OPERATING SYSTEM JITTER FROM POWER CONSUMPTION MEASUREMENTS

(71) Applicant: INTERNATIONAL BUSINESS MACHINES CORPORATION, Armonk, NY (US)

(72) Inventors: Vadim Elisseev, Warrington (GB); Kirk Jordan, Andover, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 16/297,643

(22) Filed: Mar. 9, 2019

(65) Prior Publication Data

US 2020/0285511 A1 Sep. 10, 2020

(51) Int. Cl.
*G06F 9/46* (2006.01)
*G06F 9/48* (2006.01)

(52) U.S. Cl.
CPC .......... *G06F 9/4893* (2013.01); *G06F 9/4856* (2013.01)

(58) Field of Classification Search
CPC .................................................. G06F 9/4893
USPC ......................................................... 718/102
See application file for complete search history.

(56) References Cited

U.S. PATENT DOCUMENTS

| | | | |
|---|---|---|---|
| 6,928,473 B1 * | 8/2005 | Sundaram | H04L 43/087 709/223 |
| 7,054,358 B2 | 5/2006 | Yamaguchi et al. | |
| 7,236,555 B2 | 6/2007 | Brewer | |
| 7,756,654 B2 | 7/2010 | Yamamoto et al. | |
| 8,044,724 B2 | 10/2011 | Rao et al. | |

(Continued)

FOREIGN PATENT DOCUMENTS

JP 2002-168895 A 6/2002

OTHER PUBLICATIONS

Mell, P. et al., "Recommendations of the National Institute of Standards and Technology"; NIST Special Publication 800-145 (2011); 7 pgs.

(Continued)

*Primary Examiner* — Evral E Bodden
(74) *Attorney, Agent, or Firm* — Intelletek Law Group, PLLC; Gabriel Daniel, Esq.

(57) ABSTRACT

A method and system of managing operating system (OS) jitter are provided. Power consumption information is received for a first time period of a compute node of the plurality of compute nodes of a large-scale computing system, wherein the compute node is running a subject program. A digital signature of a power spectrum of the compute node is determined based on the power consumption information. The digital signature of the power spectrum is compared to a baseline power spectrum. Upon determining that the digital signature of the power spectrum varies beyond a threshold from the baseline power spectrum, the subject program is identified as a source of incompatible OS jitter. An OS jitter mitigation measure is performed. Upon determining that the digital signature of the power spectrum does not vary beyond the threshold from the baseline power spectrum, the digital signature of the power spectrum is stored in a memory.

20 Claims, 10 Drawing Sheets

(56) References Cited

U.S. PATENT DOCUMENTS

| | | | |
|---|---|---|---|
| 8,141,044 B2 * | 3/2012 | Mann | G06F 11/3476 |
| | | | 717/124 |
| 8,407,535 B2 * | 3/2013 | Whitby-Strevens | |
| | | | H04B 17/0085 |
| | | | 714/704 |
| 9,268,938 B1 | 2/2016 | Gonzalez et al. | |
| 2011/0138363 A1 | 6/2011 | Schmelter et al. | |
| 2011/0138365 A1 | 6/2011 | Schmelter et al. | |
| 2011/0138366 A1 | 6/2011 | Wintergerst et al. | |
| 2011/0138385 A1 | 6/2011 | Schmelter et al. | |
| 2011/0295536 A1 | 12/2011 | Yoda et al. | |
| 2012/0146539 A1 | 6/2012 | Riesebosch | |
| 2013/0078925 A1 * | 3/2013 | Aguirre | H04W 4/021 |
| | | | 455/62 |

OTHER PUBLICATIONS

Petrini, F. et al., "The Case of the Missing Supercomputer Performance: Achieving Optimal Performance on the 8,192 Processors of ASCI Q"; ACM (2003); 17 pgs.

\* cited by examiner

TOOL FOR IDENTIFYING SOURCES OF OPERATING SYSTEM JITTER FROM POWER CONSUMPTION MEASUREMENTS

BACKGROUND

Technical Field

The present disclosure generally relates to operating system jitter, and more particularly, to identifying sources of operating system jitter in computing systems.

Description of the Related Art

In recent years, advancements in computer and software technologies have provided tremendous improvements in computational speed. Multiple processes can be run concurrently in multi-core architectures and distributed resources, such as cloud, grid, cluster, and distributed computing, collectively referred to herein as large-scale computing systems. Such large-scale-computing systems are subject to operating system interference, which may be caused by scheduling of daemon processes and handling of asynchronous events, such as interrupts. This interference introduces "noise" or "jitter," collectively referred to herein as operating system (OS) jitter.

SUMMARY

According to various embodiments, a computing device, a non-transitory computer readable storage medium, and a method are provided for managing operating system (OS) jitter of a large-scale computing system having a plurality of compute nodes. In an active phase, power consumption information is received for a first time period of a compute node of the plurality of compute nodes of the large-scale computing system, wherein the compute node is running a subject program. A digital signature of a power spectrum of the compute node is determined based on the power consumption information. The digital signature of the power spectrum is compared to a baseline power spectrum of the compute node. Upon determining that the digital signature of the power spectrum varies beyond a threshold from the baseline power spectrum, the subject program is identified as a source of incompatible OS jitter and an OS jitter mitigation measure is performed. Upon determining that the digital signature of the power spectrum does not vary beyond the threshold from the baseline power spectrum, the digital signature of the power spectrum is stored in a memory.

In one embodiment, the power consumption information for the first time period is a time series of power consumed at predetermined intervals at the compute node.

In one embodiment, the OS jitter mitigation measure comprises migrating a program running on the compute node that is adversely affected by the OS jitter to another compute node of the large-scale computing system.

In one embodiment, the OS jitter mitigation measure comprises migrating a program running on the compute node to another core of the compute node.

In one embodiment, the OS jitter mitigation measure comprises at least one of: (i) changing a daemon wake-up interval running on the compute node, or (ii) changing a synchronization interval of a program running on the compute node that is adversely affected by the OS jitter.

In one embodiment, the threshold from the baseline power spectrum is based on a frequency shift or amplitude change of a normalized power spike between the baseline power spectrum and the signature of the power spectrum.

In one embodiment, upon determining that the digital signature of the power spectrum varies beyond a threshold from the baseline power spectrum, it is determined which compute node of the plurality of compute nodes has a digital signature of a power spectrum that is compatible with the subject program. The OS jitter mitigation measure includes migrating the subject program to another compute node of the large-scale computing system.

In one embodiment, in a preliminary phase, for each of the plurality of compute nodes of the large-scale computing system, a baseline power consumption information when the compute node is operating under a low or nominal load condition and when not running the subject program, is received. A baseline digital signature of a power spectrum of the compute node is determined based on the baseline power consumption information. The baseline digital signature of the power spectrum of the compute node is stored in the memory.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

Figure 1:
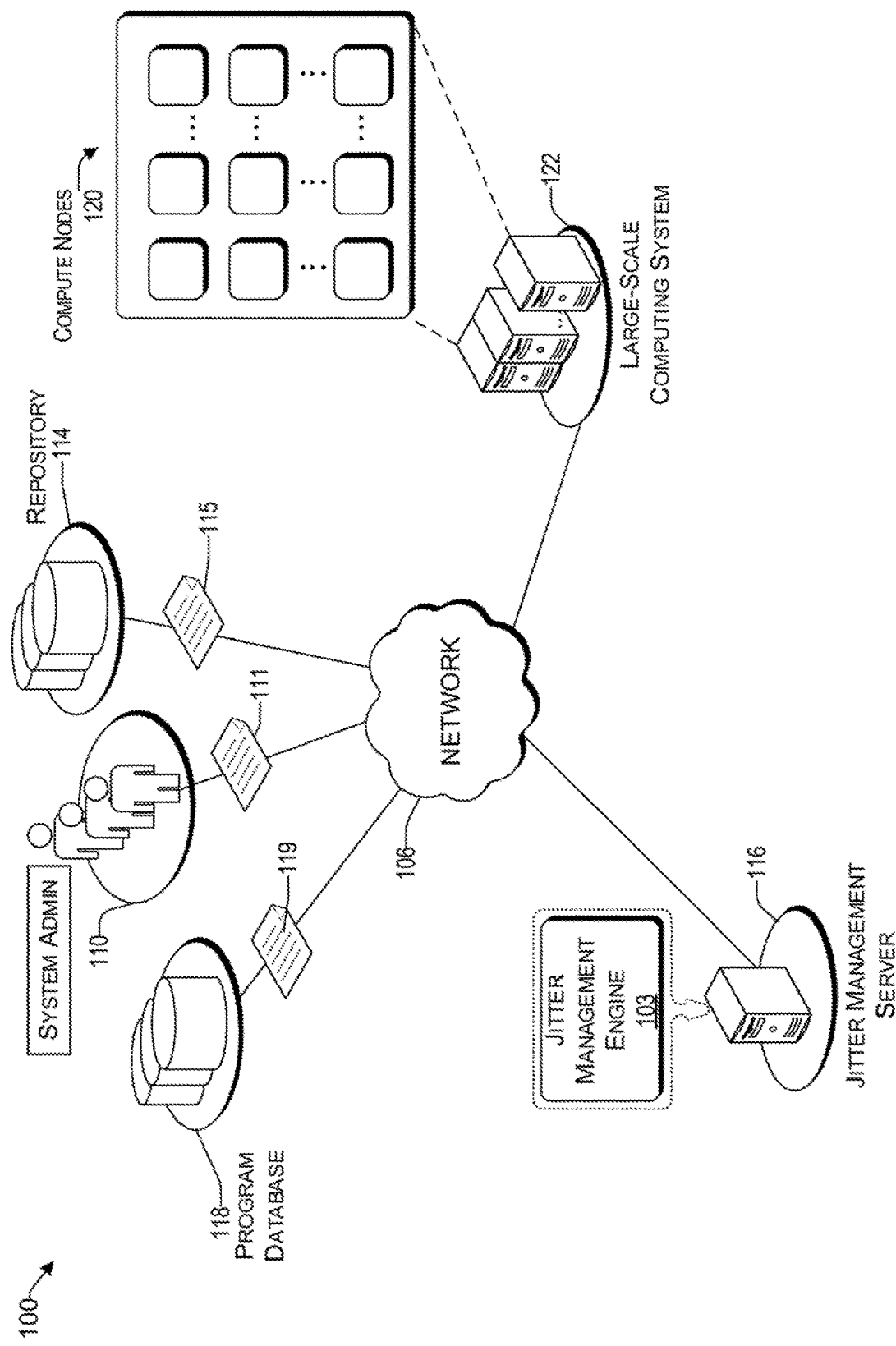
FIG. 1 illustrates an example architecture of an operating system jitter management system.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to systems and methods of identifying sources of OS jitter using power management techniques for improving performance of large-scale computing systems. The term OS jitter is used herein to describe an effect of performance degradation of large-scale computing systems, including parallel applications on supercomputers, due to activities of OS kernel (interrupts) and OS or middleware daemons. As used herein, middleware refers to software that provides services to software applications beyond those available from the operating system. A daemon includes computer program that runs as a background process, rather than being under the direct control of an interactive user.

Large class of parallel applications can provide an environment where computations can be carried out concurrently by a large number of tasks or threads until a point in time, when tasks and/or threads need to synchronized using barrier calls, also known as collective communication. Thus, in collective communication, there is a synchronization point among processes, where a point is reached in their code before the program can continue executing. The function of the task and/or thread forms a barrier, and no process in the collective communication can pass the barrier until all the processes complete their function.

Accordingly, if during a computation phase any of the tasks and/or threads are pre-empted by system activities, they will be slowed down causing other tasks/threads to wait at the synchronization call (e.g., the barrier). The latter can lead to significant degradation of performance of programs and have a negative impact on reproducibility of results (e.g., delays experienced in the programs). Stated differently, programs that have a time range to complete a function would fail timely completion.

In the realm of clustered computing, there are cases where work distributed across many systems (and many processor cores) should complete in substantially predictable timeframes. An operating system, and the software stack being leveraged, can introduce some variability in the run-times of these "chunks" of work. This variability is often referred to as OS jitter, which has debilitating effects on large-scale computing systems, such as high-performance computing (HPC), the cloud, etc. For example, programs running on a compute node that is suffering from excessive OS jitter may experience delays. Indeed, in some large-scale computing systems, the performance degradation due to the OS jitter effect has been calculated to be 50% or higher.

Identification of all possible sources of OS jitter and measurement of their impact on a program in existing systems involves a detailed trace of the OS activity. Existing general-purpose OS profiling tools, such as OProfile or the Linux kernel scheduler stats provide only a coarse measure in terms of time spent in each kernel function or process and do not uniquely measure the OS jitter perceived by a program due to each OS jitter source. Another tool for tracing events in Linux is the Linux Trace Toolkit (LTT) which, however, cannot record all interrupts and processes in a given time period without modification to the LTT. Generally, known systems are based on running benchmarks while profiling events at the OS level. Profiles data is then analyzed and potential sources of jitter are identified. If the configuration or software stack of any node of a large-scale computing system changes, the process is repeated. Known systems have the technical drawback of possible performance degradation when profiling information is collected and include intrusiveness concerns.

In contrast to existing systems, what is disclosed herein are methods and systems of managing OS jitter by identifying and analyzing power consumption profiles of compute nodes of large-scale computing systems, including HPC systems, cloud, grid cluster, and distributed architectures. In one aspect, the approach is lightweight, non-intrusive, and does not require modification of the computing system, OS, and/or programs running thereon. By virtue of the concepts discussed herein, remedial action can be taken to prevent one or more programs running on a compute node to suffer from excessive OS jitter, thereby solving the technical problem of undue delays suffered by large-scale computing systems. Reference now is made in detail to the examples illustrated in the accompanying drawings and discussed below.

Example Architecture

FIG. 1 illustrates an example architecture 100 of an OS jitter management system. The architecture 100 may include a jitter management server 116 that hosts a jitter management engine 103. There is a network 106 that allows the jitter management engine 103 to communicate with various resources connected to the network 106, such as a database repository 114, a program database 118, one or more system administrators 110, and the large-scale computing system 122 having a plurality of compute nodes 120. The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet, that provides various ancillary services, such as communication with the database repository 114, program database 118, one or more system administrators 110, and the large-scale computing system 122.

The database repository 114 represents one or more databases that include power consumption information of various compute nodes 120 of the large-scale computing system 122. In various embodiments, a large-scale-scale computing system 122 may represent a cluster, grid, distributed computing, or cloud system. The large-scale computing system 122 comprises a plurality of compute nodes 120 that can be used to run various processes, programs, applications, daemons, etc., concurrently. For simplicity, the following discussion will refer to programs, while it will be understood that processes, applications, daemons, etc., could be used as well. The large-scale computing system 122 is subject to potential performance degradation due to OS jitter, as discussed above.

The jitter management engine 103 of the jitter management server 116 is operative to determine the performance of each of the compute nodes of the large-scale computing system 122 to ultimately minimize the effects of OS jitter. To that end, the jitter management engine 103 is operative to receive power consumption information from each of the plurality of compute nodes of the large-scale computing system 122. For example, the jitter management engine 103 can use an intelligent platform management interface (IPMI) to facilitate management and monitoring capabilities of the host system's CPU, firmware, and operating system. An IPMI includes a main controller, sometimes referred to as a baseboard management controller (BMC), and other management controllers distributed among different compute nodes 120 of the large-scale computing system 122. The BMC can determine the power consumption of its corresponding one or more compute nodes and make it available to the jitter management engine 103. The power consumption information may be a time series for a time segment (e.g., 60 seconds). The time series of the power consumed at predetermined granularity may be provided to the jitter management engine 103 at predetermined intervals or a trigger event (e.g., request from the jitter management engine 103 or upon a new program (e.g., a middleware daemon) running on a compute node). Thus, the power consumption information is a time series of power consumed at a compute node in a time segment. In one aspect, the monitoring discussed herein does not present an additional computational load on the large-scale computing system 122. Power consumption is collected by each node hardware and firmware, which is configured to not affect subsystems, which are handling actual workloads (OS, middleware, applications). That is because the information is provided off-band (e.g., via a separate access channel). BMCs and similar devices can be accessed over the network 106 via a separate dedicated interface, without interfering with OS and applications.

Based on the received power consumption information (i.e., time series), the jitter management engine 103 determines a power spectrum of each compute node of the large-scale computing system 122. The time series and/or power spectrum 115 can be stored in the database repository 114 as baseline data that may later be used by the jitter management engine 103 for comparison to determine whether threshold criteria are met. When one or more threshold criteria are met, the jitter management engine 103 can perform various jitter mitigating measures, such as sending an alert 111 to one or more system administrators 110 of the large-scale computing system 122, migrating a program deemed to be a problematic source of jitter to another compute node of the large-scale computing system 122 that has a digital signature of a power spectrum that is more compatible therewith, or turning OFF the problematic program. Other jitter mitigation measures may include using a different core, changing daemon wake-up intervals, and/or changing synchronization intervals of a program. In this way, the technical problem of managing the OS jitter of the large-scale computing system 122 is accommodated.

In some embodiments, there is a program database 118 that is operative to provide various metrics 119 to the jitter management engine 103 regarding programs running on a compute node of interest. These metrics 119 can be used by the jitter management engine 103 to determine what the timing requirements are for the corresponding program. If the OS jitter introduced by a program exceeds the thresholds detailed in the program database 118, then the jitter management engine 103 can perform the jitter mitigation issues discussed herein, thereby assuring the health of the new program introduced or one or more other programs running on the subject compute node.

In some embodiments, the jitter management engine 203 uses artificial intelligence (AI) to determine which jitter mitigation measure to take. For example, the jitter management engine 103 can use a corpus of data stored in the database repository 114 to compare to previously successfully executed mitigation strategies based on the available base line and new digital signatures of the power spectrum of various compute nodes 120. Further, the jitter management engine 103 can receive the metrics 119 regarding timing requirements of a subject program to better understand whether a new program introduced to a compute node is a source of the loss of performance. Based on machine learning, patterns, and trends, that are consistent with a scenario that degrades the performance of a program can be identified. In various embodiments, the machine learning discussed herein may be supervised or unsupervised. In supervised learning, the jitter management engine 103 may be presented with example data as being acceptable or problematic. Stated differently, the example data 119 provided by the program database 118 and the database repository 114 acts as a teacher for the jitter management engine 103. In unsupervised learning, the jitter management engine 103 is not provided with any labels as what is acceptable or problematic, rather, it simply provides historic data to the jitter management engine 103 that can be used to find its own structure among the data to determine (i) whether a present configuration is problematic for a subject program; (ii) best mitigation measure to take; (iii) whether to shut down an offending program that is deemed to be a source of excessive OS jitter; or (iv) what compute node to migrate a new program to such that a threshold OS jitter is not exceeded. In various embodiments, the machine learning may make use of techniques such as supervised learning, unsupervised learning, semi-supervised learning, deep learning, naïve Bayes, Bayesian networks, decision trees, neural networks, fuzzy logic models, and/or probabilistic classification models to find a source for an executable code for an auditable unit.

While the program database 118, database repository 114, jitter management server 116, and the large-scale computing system 122 are illustrated by way of example to be on separate platforms, these platforms may be combined in various combinations. In other embodiments, one or more of these computing platforms may be implemented by virtual computing devices in the form of virtual machines or software containers that are hosted in the cloud, thereby providing an elastic architecture for processing and storage, discussed in more detail later. Thus, the functionality described herein with respect to each of the program database 118, database repository 114, jitter management server 116, and the large-scale computing system 122 can also be provided by one or multiple different computing devices or platforms.

Example Block Diagram

Figure 2:
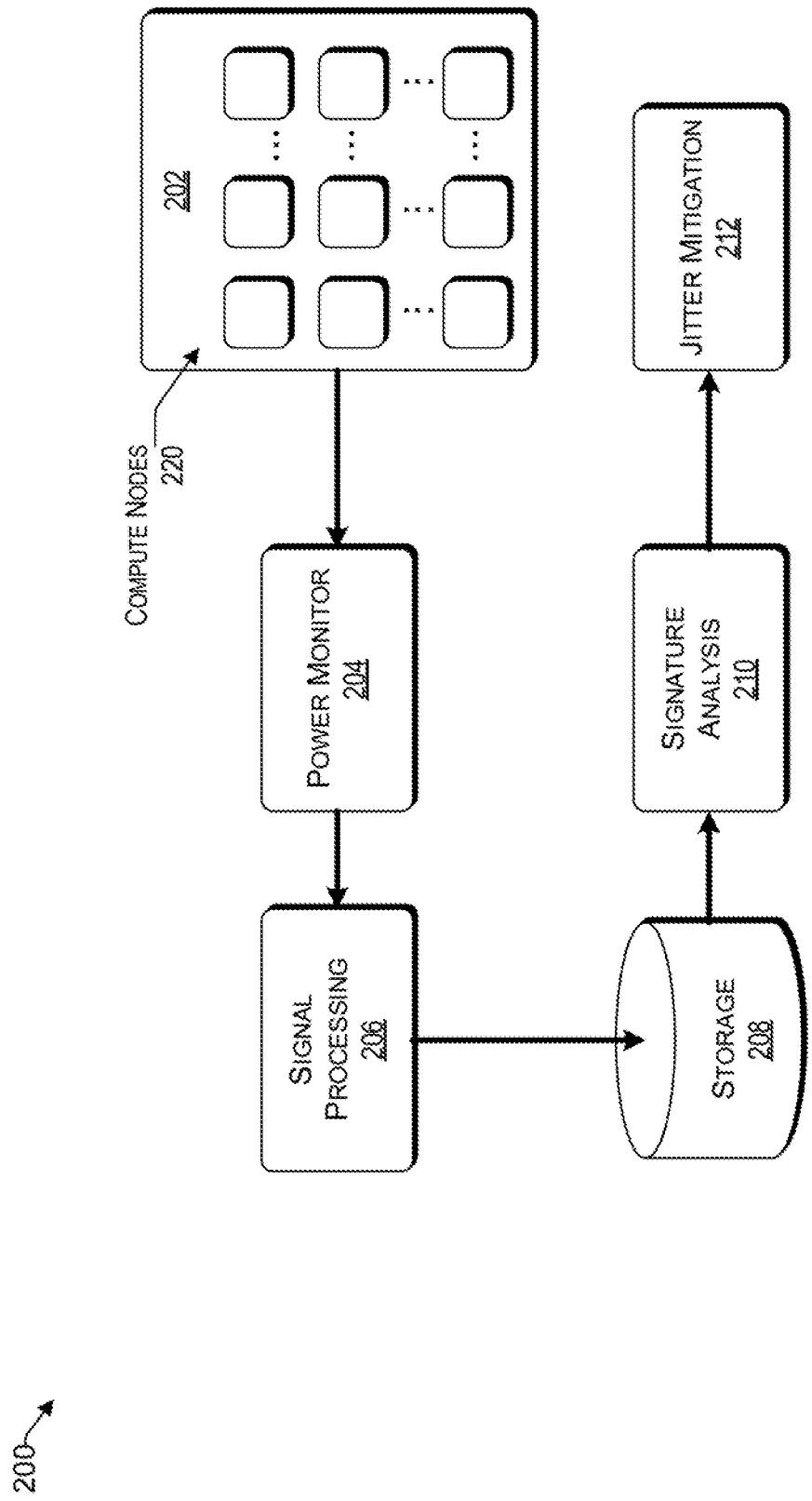
FIG. 2 is an example block diagram of a system that is configured to manage operating system jitter of a large-scale computing system.

Reference now is made to FIG. 2, which is an example block diagram of a system 200 that is configured to manage OS jitter of a large-scale computing system, consistent with an illustrative embodiment. The large-scale computing system 202 includes a plurality of compute nodes 220, which by way of non-limiting example, may reach hundreds or thousands. For example, a compute node may be a server. A compute node may be single core or multi-core. In the context of HPC, there may be multiple (e.g., 2 or more) CPU sockets. Each CPU socket has a plurality of cores (e.g., 24 or more). In the present example, there would be 48 cores in a compute node, while it will be understood that in other architectures, different number of cores would be in a compute node. The large-scale computing system 202 is subject to performance degradation based on OS jitter from the compute nodes 220.

There is a power monitoring module 204 that is operative to determine the power consumption of each compute node in the cluster of compute nodes 220 of the large-scale computing system 202. For example, each compute node may be associated with one or more sensors that are operative to measure key performance indicators, such as CPU usage, memory usage, network usage, CPU temperature, power consumption, etc. In one embodiment, the sensor information is provided by a BMC, discussed previously. In some scenarios, these sensors can provide power consumption resolution in sub-millisecond range, with latencies less than one microsecond. In this way, a very fine resolution of power consumption can be obtained. The power consumed may be based on different power consumption granularity, depending on the available sensors. For example, the power consumption may be based on the CPU, socket, memory consumption, or remaining components, a combination thereof, or a total consumption by the compute node. In one embodiment, the power consumption is based on the CPU and core, as these are the most relevant power consumption sources relating to OS jitter.

Accordingly, the power monitor module 204 can receive a time series of the power consumed at each compute node. In various embodiments, the power information may be received continuously (e.g., in real time) or in time segments that can be recreated by the power monitor module 204. Further, the power information may be received from the compute nodes 220 as separate data packages or in a single data package concurrently for all compute nodes 220.

Figure 3A:
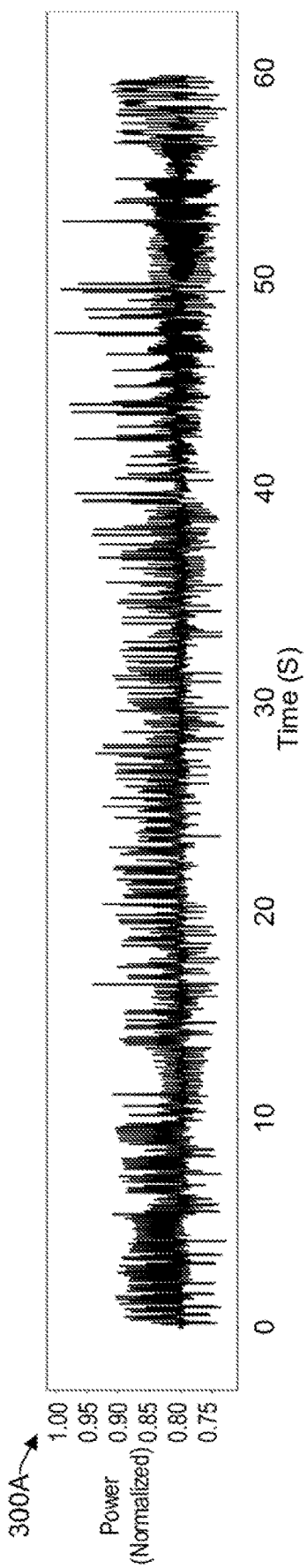
FIG. 3A is a graph of a time series of power consumed at a compute node for a time segment, consistent with an illustrative embodiment.

Reference now is made to FIG. 3A, which is a graph 300A of a time series of power consumed at a compute node for a time segment, consistent with an illustrative embodiment. By way of example, graph 300A illustrates a scenario with a minimal or nominal load. Stated differently, the compute nodes 202 of the large-scale computing system 202 are known to be operating under nominal or best-case conditions. For example, for each of the compute nodes 220: a computational demand, CPU temperature, memory usage, etc., are below predetermined thresholds, respectively. Graph 300A illustrates that there is a relatively even distribution of power consumption during the 60 second time series.

Referring back to FIG. 2, there is a signal processing module 206 that is operative to receive the time series of power consumed at a compute node in a time segment to perform signal processing thereon, to determine a baseline of power consumption, similar to that of FIG. 3A discussed above. For example, the baseline may be based on a scenario where the compute nodes are known to be operating under nominal or best-case conditions, as discussed above. The baseline may comprise a digital signature of a power spectrum of a compute node from the received time series of power consumption for the corresponding time segment. This analysis can be performed for the remaining compute nodes as well.

Figure 3B:
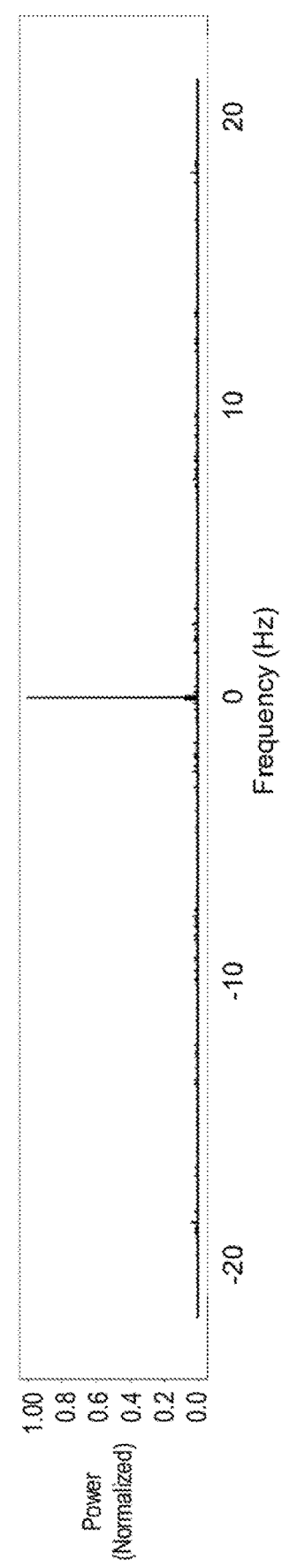
FIG. 3B is a graph of a frequency spectrum of power consumed by a compute node based on the time series of FIG. 3A, consistent with an illustrative embodiment.

Reference now is made to FIG. 3B, which is a graph 300B of a frequency spectrum of the power consumed by a compute node based on the time series of FIG. 3A, consistent with an illustrative embodiment. Stated differently, graph 300B provides the power consumed by a compute node at different frequencies. The distribution may reflect different events occurring at different frequencies. For example, a kernel may operate at a high frequency, thereby generating a high frequency noise. There may be noise that may be generated at a lower frequency. FIG. 3B indicates that there are no frequencies where the normalized power is above a predetermined threshold, thereby indicating that the baseline is not subject to excessive OS jitter for the subject compute node. Again, this process can be repeated for other compute nodes of the large-scale computing system 202.

Figure 4A:
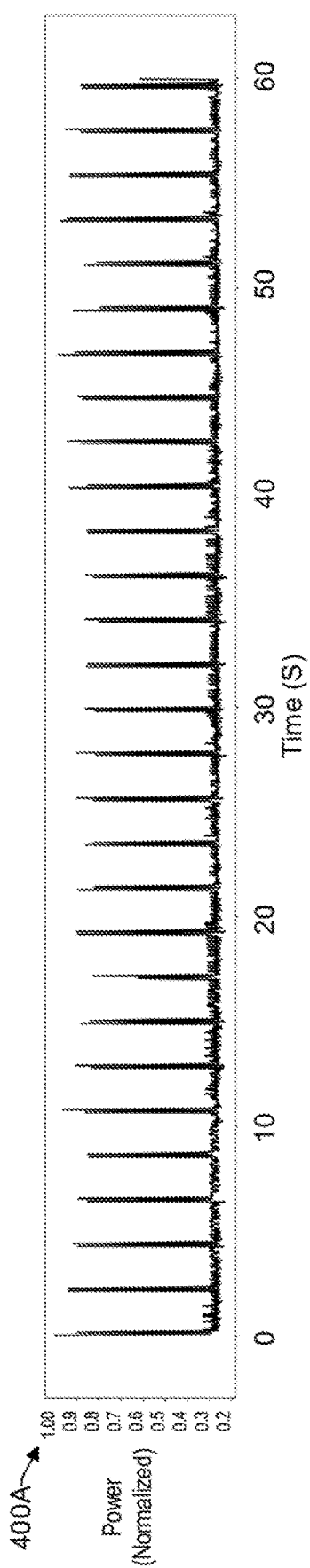
FIG. 4A illustrates an example graph of a time series of power consumed at a compute node having an additional program running thereon.

By way of contrast, FIG. 4A illustrates a graph 400A of a time series of power consumed at a compute node having an additional program running thereon. For example, the additional program may be a (e.g., middleware) daemon. Applicants have identified that the power spikes can be a result of asynchronous events, such as interrupts. If such events occur only once or very seldom, these events generally do not lead to a substantial increase in OS jitter. However, if such events occur periodically, then they can lead to a cumulative effect, thereby increasing OS jitter of a compute node running various processes. Each spike has an associated amplitude, indicating the (e.g., normalized) power consumption for different time intervals.

As discussed previously, OS jitter may arise out of scheduling of daemon processes, and handling of asynchronous events such as interrupts. An interruption experienced by a program can be due to a variety of reasons. For example, a single daemon or interrupt occurs when the program is running and takes a unique time every time it occurs, thereby causing a unique interruption to the program every time. A plurality of successive daemons or interrupts occur when the program is running, causing an interruption to the program that is equal to the sum of the individual execution times. A plurality of non-successive daemons or interrupts occur when the program is running, causing an interruption to the program that is equal to the sum of their individual execution times. In some scenarios, a plurality of nested interrupts occur when the program is running, causing an interruption to the program that is equal to the sum of their individual execution times. It will be understood that there may be other ways to produce an interruption of a program and all such methods and/or procedures fall within the scope of the present application.

Figure 4B:
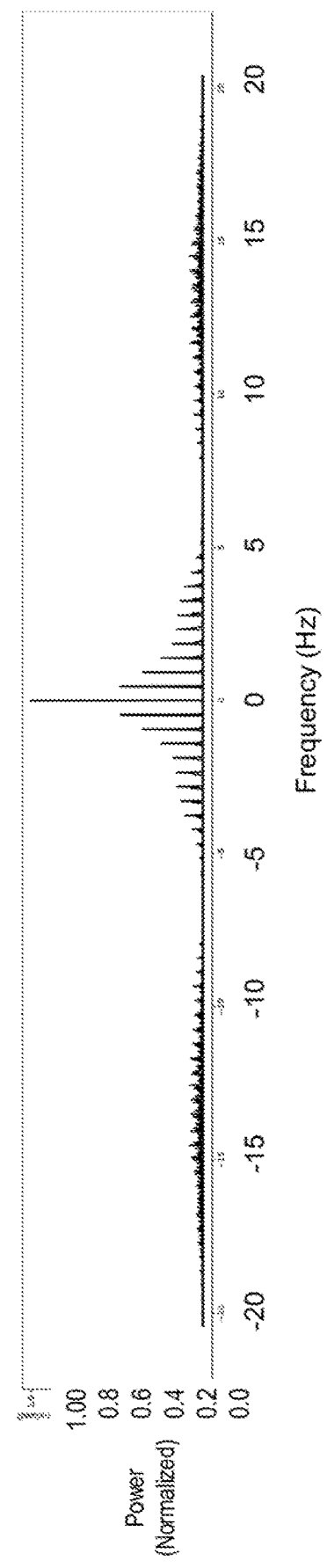
FIG. 4B is a graph of a frequency spectrum of power consumed by a compute node based on the time segment of FIG. 4A, consistent with an illustrative embodiment.

FIG. 4B is a graph 400B of a frequency spectrum the power consumed by a compute node based on the time segment of FIG. 4A, consistent with an illustrative embodiment. Accordingly, a digital signature of the power spectrum is provided, indicating a wider band of power consumption and higher amplitude of the power in the spikes, which is indicative of increased OS jitter as compared to graph 300B of FIG. 3B.

Referring back to FIG. 2, the digital signature of the power spectrum and the time series of power consumed in a time segment of FIGS. 3A and 3B can be stored in a database storage module 208, similar to that of the database repository 114 of FIG. 1. The time series and/or power spectrum that is stored in the database repository 114 can be retrieved and used as baseline data to determine whether threshold criteria are met for a more recently obtained power consumption information of one or more compute nodes 220 provided by the power monitor 204 and the signal processing 206 modules during a later time segment. To that end, there is a signature analysis module 210 to compare the digital signature of the power spectrum to a signature of a baseline power spectrum retrieved from the storage module 208. The analysis of the signature analysis module 210 performs the analysis at predetermined intervals or upon a trigger event, such as a new program being installed on a compute node.

For example, if the new software being installed has a frequency cycle that is similar to that of the digital signature of the power spectrum (e.g., has a daemon that wakes up at a predetermined interval), then the new program being installed will be a source of OS jitter to the compute node. That is because its operation will compete for CPU cycles with existing programs running on the compute node. From a different perspective, if there are one or more programs already running on the compute node that have a frequency cycle that is similar to that of a new program that is being installed, then the new program will degrade the performance of the one or more programs already running on the compute node by increasing the OS jitter of the compute node.

Upon determining that one or more threshold criteria are met, remedial action can be taken by the jitter mitigation module 212. For example, upon determining that the digital signature of the spectrum and/or the digital signature of the time series of power consumed of the compute node varies beyond one or more thresholds, the deviation is attributed to an increase in OS jitter caused by the newly introduced program in the compute node. For example, one threshold criteria may be a delta (i.e., threshold) change in amplitude in the normalized power for a power spike between the baseline and the new digital signature of the power spectrum. Other criteria may be a number of spikes that are above a threshold amplitude, or a location of spikes that are above a threshold amplitude. Another threshold can be a value of frequency shift between dominant frequencies of different power spectrums, as provided by equation 1 below:

$$|Freq(P_{MAX1}) - Freq(P_{MAX2})| < Threshold \quad (Eq. 1)$$

In one embodiment, a mitigation measure performed by the jitter mitigation module 212 is sending a notification to one or more system administrators of the large-scale computing system 202 or a developer of the newly introduced program. Alternatively, or additionally, the newly introduced program can be deactivated or migrated to a compute node that is more compatible to the OS jitter introduced by the newly introduced program. Compatibility can be determined by way of comparison of the digital signature of the power spectrum of each compute node to the extracted digital signature of the power spectrum attributed to the newly introduced program. In one embodiment, the digital signature of the power spectrum of the newly introduced program can be determined by comparing/subtracting the power spectrum obtained with the new program present with the baseline power spectrum of the corresponding compute node. In some embodiments, one or more existing programs (i.e., that are already running on a compute node) can be migrated to another compute node based on the frequency of operation of the program being moved and the digital signature of the baseline power spectrum of other compute nodes. In this regard, the compute node that has frequency components that is different from that of the program being moved is chosen as the recipient of the migration.

Figure 5:
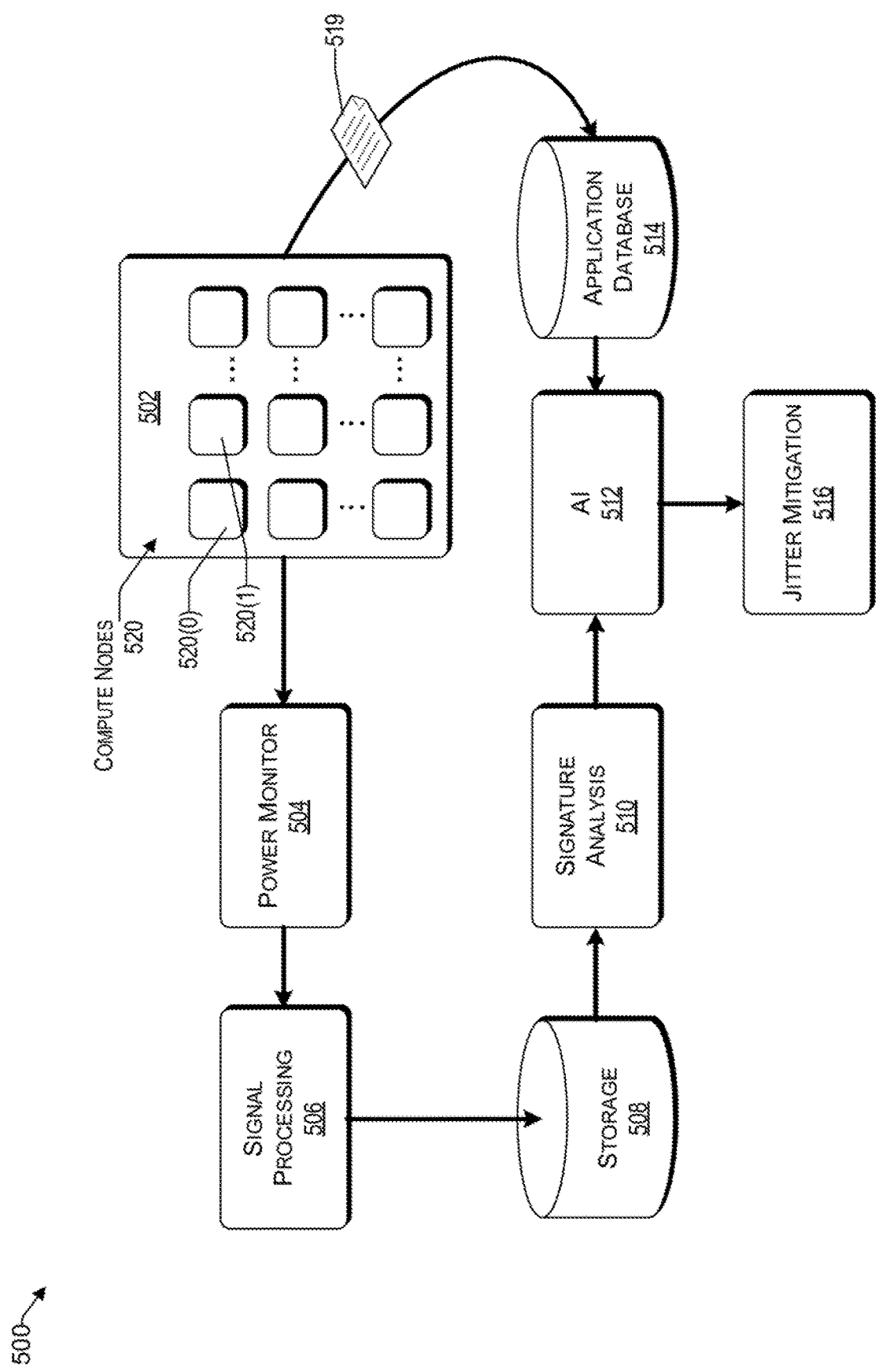
FIG. 5 is an example block diagram of a system that is configured to manage operating system jitter of a large-scale computing system by using artificial intelligence, consistent with an illustrative embodiment.

Reference now is made to FIG. 5, which is an example block diagram of a system 500 that is configured to manage OS jitter of a large-scale computing system 502 by using artificial intelligence (AI), consistent with an illustrative embodiment. Elements 502 to 510 are substantially similar to elements 202 to 210, respectively, discussed above and are therefore not repeated here for brevity. System 500 includes a program database 514 that is operative to store various metrics of programs. The program database 514 may indicate what the expected delays (e.g., min, nominal, max values) are for various functions performed by a subject program. For example, the minimum, nominal, and maximum time for a program to provide an expected result may be 10, 20, and 30 seconds, respectively. But the actual performance information 519 provided by a recent computation on a compute node 520(0) of the large-scale computing system 502 may be 40 seconds, and thus, beyond the expected range of performance for the subject program. This degradation in performance may be caused by OS jitter in the compute node 520(0). In this regard, the AI module 512 can receive the results of the signature analysis module 510, which may indicate an excessive amount of OS jitter for the subject compute node 520(0) to determine whether the present degradation in performance is attributable to this OS jitter.

Further, the AI module 512 can work together with the jitter mitigation module 516 to determine the appropriate jitter mitigation measure to perform. For example, if programs A, B, C, D, and E are running concurrently on a subject compute node 520(0) and program B is experiencing un unacceptable level of degradation of performance, the AI module 512 can determine whether to turn OFF any program running on compute node 520(0). Alternatively, or in addition, the AI module 512 can determine whether to migrate the subject program to another compute node. In one embodiment, if migration is determined to be an appropriate course of action, the AI module 512 can determine which program to move to which compute node. For example, the AI module 512 can work together with the jitter migration module 516 to migrate the program B to a compute node that has a digital signature of a power spectrum that is compatible with that of program B (e.g., 520(1)). For example, the frequency of operation of program B received from the program database 514 can be compared to the digital signature of the power spectrum of each of the compute nodes 520 to match it to a compute node that does not have spikes (or has spikes that are below a predetermined threshold) at the frequencies of program B. The recommended changes can then be implemented by the jitter migration module 516.

Example Processes

Figure 6:
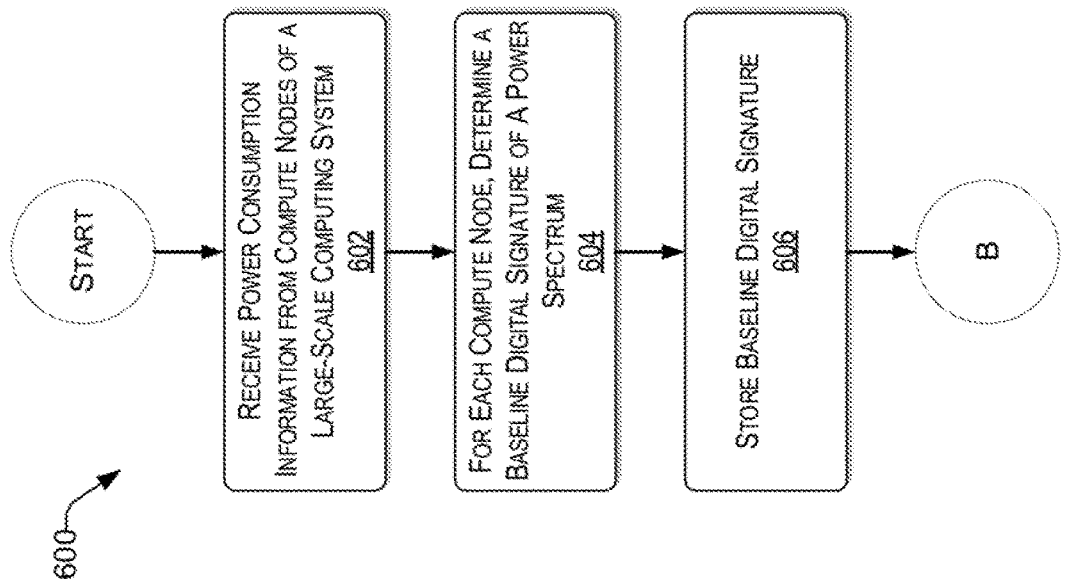
FIG. 6 presents an illustrative process for a preliminary phase of mitigating operating system jitter of a large-scale computing system, consistent with an exemplary embodiment.
Figure 7:
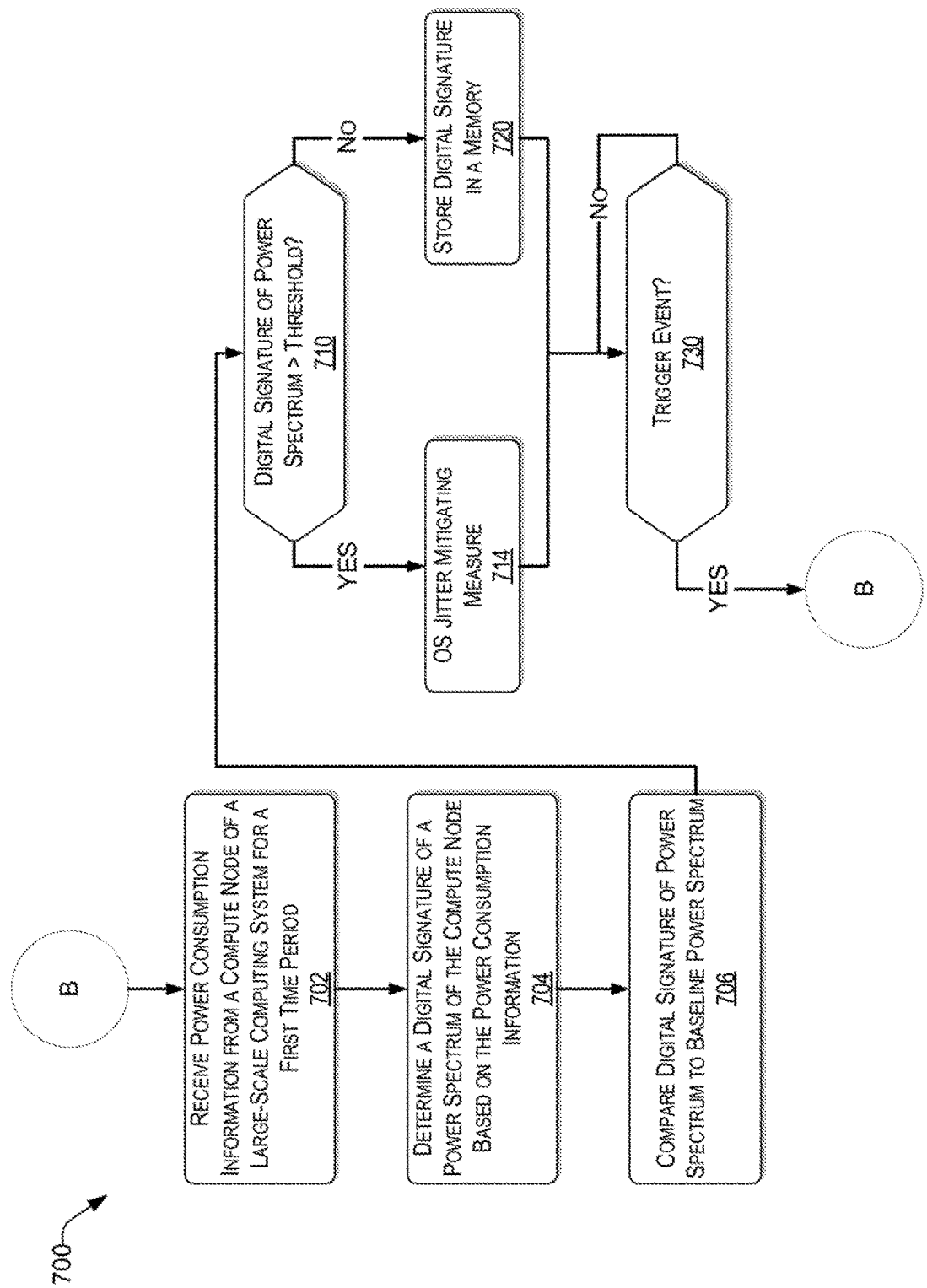
FIG. 7 presents an illustrative process for an active phase of mitigating operating system jitter of the large-scale computing system, consistent with an exemplary embodiment.

With the foregoing overview of the example architecture 100 and conceptual block diagrams 200 and 500 of example systems, it may be helpful now to consider a high-level discussion of example processes. To that end, FIGS. 6 to 7 present illustrative processes related to managing OS jitter by identifying and analyzing power consumption profiles of large-scale computing systems. Processes 600 and 700 are illustrated as a collection of blocks in a logical flowchart, which represent sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the processes 600 and 700 are described with reference to the architecture 100 of FIG. 1.

FIG. 6 presents an illustrative process 600 for a preliminary phase of mitigating OS jitter of a large-scale computing system, consistent with an exemplary embodiment. The preliminary phase may occur before the active phase discussed in the context of FIG. 7 below.

At block 602, for each of the plurality of compute nodes 120 of the large-scale computing system 122, the jitter management engine 103 receives baseline power consumption information. More particularly, the baseline power consumption information is based on a time segment when the corresponding compute node is operating under a low or nominal load condition and when not running a subject program (which will be introduced later in the context of the discussion of FIG. 7.) In one embodiment, the power consumption information comprises a time series of power consumed at predetermined intervals at the corresponding compute node.

At block 604, for each compute node, a baseline digital signature of a power spectrum of the compute node is determined based on the power consumption information.

At block 606, for each compute node, the baseline digital signature of the power spectrum of the compute node is stored in a memory. In various embodiments, these baseline digital signatures are stored in a memory of the jitter management server 116 or a database repository 114. In some embodiments, the time series of the power consumed is stored as well for each corresponding compute node. The stored information can then be used (i.e., during an active phase) to manage the OS jitter of subject compute nodes being evaluated.

Reference now is made to FIG. 7, which presents an illustrative process 700 for an active phase of mitigating OS jitter of the large-scale computing system 122, consistent with an exemplary embodiment. For example, the active phase may be a continuation of the preliminary phase discussed in the context of FIG. 6.

At block 702, the jitter management engine 103 receives power consumption information for a first time period of a compute node of the plurality of compute nodes 120 of the large-scale computing system 122. Further, the compute node is now running a program, which is a subject of an evaluation for OS jitter. For example, the program can be a (e.g., middleware) daemon. The power consumption information may be a time series of power consumed at predetermined intervals at the compute node.

At block 704, the jitter management engine 103 determines a digital signature of a power spectrum of the compute node based on the received power consumption information.

At block 706, the jitter management engine 103 compares the digital signature of the power spectrum to a baseline power spectrum of the compute node. More particularly, the jitter management engine 103 retrieves the baseline power spectrum for the subject compute node from the memory (e.g., database repository 114), which was stored during the preliminary phase discussed above in the context of FIG. 6.

At block 710, the jitter management engine 103 determines whether the digital signature of the power spectrum upon determining that the digital signature of the power spectrum varies beyond a threshold from the baseline power spectrum. If so (i.e., "YES" at determination block 710), the process continues with block 714, where the subject program is identified as a source of incompatible OS jitter. Further, one or more OS jitter mitigation measures are performed. For example, a notification can be sent by the jitter management engine 103 to a system administrator of the large-scale computing system 122 to alert that an OS jitter of a subject compute node has exceeded a predetermined threshold.

Alternatively, or in addition, the jitter management engine 103 can migrate the subject program or another program running on the compute node that is adversely affected by the OS jitter, to another compute node of the large-scale computing system 122. For example, based on the stored baseline digital signatures of the power spectrum, the jitter management engine 103 can determine which compute node of the large-scale computing system 122 is compatible (i.e., would better accommodate) the subject program or any other program running on the subject compute node experiencing excessive OS jitter, such that the subject compute node would not suffer from the excessive OS jitter and/or to prevent a program from experiencing unacceptable delays. Compatibility depends on the frequency of operation of the program with respect to the digital signature of the power spectrum of the available compute nodes. In some embodiments, the OS jitter mitigation measure comprises disabling the subject program.

At block 730, the jitter management engine 103 determines whether another trigger event has occurred. For example, a trigger event may be a predetermined time period or a new program being introduced to a compute node. If no trigger event occurs (i.e., "NO" at decision block 730), the process continues at block 730 (i.e., waits until a trigger event occurs). If a trigger event occurs (i.e., "YES" at decision block 730), the process returns to block 702, thereby continuing the iterative process.

Returning to block 710, upon determining that the digital signature of the power spectrum does not vary beyond the threshold from the baseline power spectrum (i.e., "NO" at decision block 710), the process continues with block 720, where the jitter management engine 103 stores the digital signature of the power spectrum in a memory (e.g., of the jitter management server 116 and/or the database repository 114). The process then continues with block 730, as discussed above.

Example Computer Platform

Figure 8:
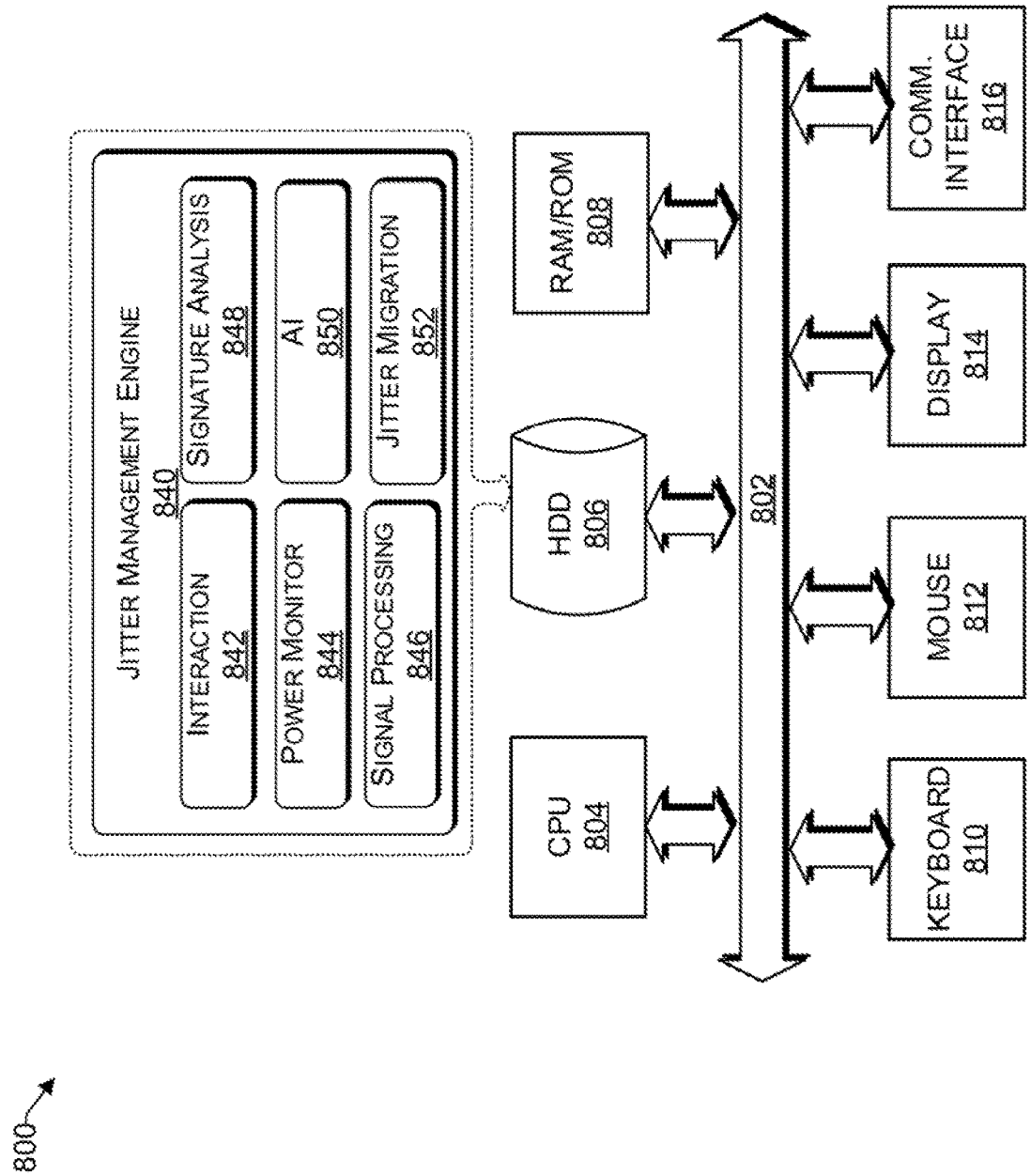
FIG. 8 provides a functional block diagram illustration of a specifically configured computer hardware platform that is capable of managing operating system jitter, consistent with an illustrative embodiment.

As discussed above, functions relating to managing OS jitter of a large-scale computing system having a plurality of compute nodes, as shown in FIG. 1 and in accordance with the processes 600 to 700 of FIGS. 6 to 7, respectively, may involve one or more computing devices. In this regard, FIG. 8 provides a functional block diagram illustration of a specific computer hardware platform that is capable of managing OS jitter. In particular, FIG. 8 illustrates a network or host computer platform 800, as may be used to implement an appropriately configured server, such as the jitter management server 116 of FIG. 1.

The computer platform 800 may include a central processing unit (CPU) 804, a hard disk drive (HDD) 806, random access memory (RAM) and/or read only memory (ROM) 808, a keyboard 810, a mouse 812, a display 814, and a communication interface 816, which are connected to a system bus 802.

In one embodiment, the HDD 806, has capabilities that include storing a program that can execute various processes, such as the jitter management engine 840, in a manner described herein. The jitter management engine 840 may have various modules configured to perform different functions.

For example, there may be an interaction module 842 that is operative to store and/or receive electronic data from various sources, including the program database 118. There may be a power monitor module 844 operative to determine the power consumption of various compute nodes of the large-scale computing system 122. There may be a signal processing module 846 operative to extract a digital signature of a power spectrum of each compute node. There may be a signature analysis module 848 operative to compare different digital signatures of power spectrum to extract OS jitter concerns therefrom. There may be an artificial intelligence module 850 operative to determine which jitter mitigation measure to take. There may be a jitter migration module 852 operative to execute one or more OS jitter mitigation measures.

In one embodiment, a program, such as Apache™, can be stored for operating the system as a Web server. In one embodiment, the HDD 806 can store an executing program that includes one or more library software modules, such as those for the Java™ Runtime Environment program for realizing a JVM (Java™ virtual machine).

Example Cloud Platform

As discussed above, functions relating to managing operating system jitter of a large-scale computing system having a plurality of compute nodes, may include a cloud implementation of the large-scale computing system large-scale computing system 122. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
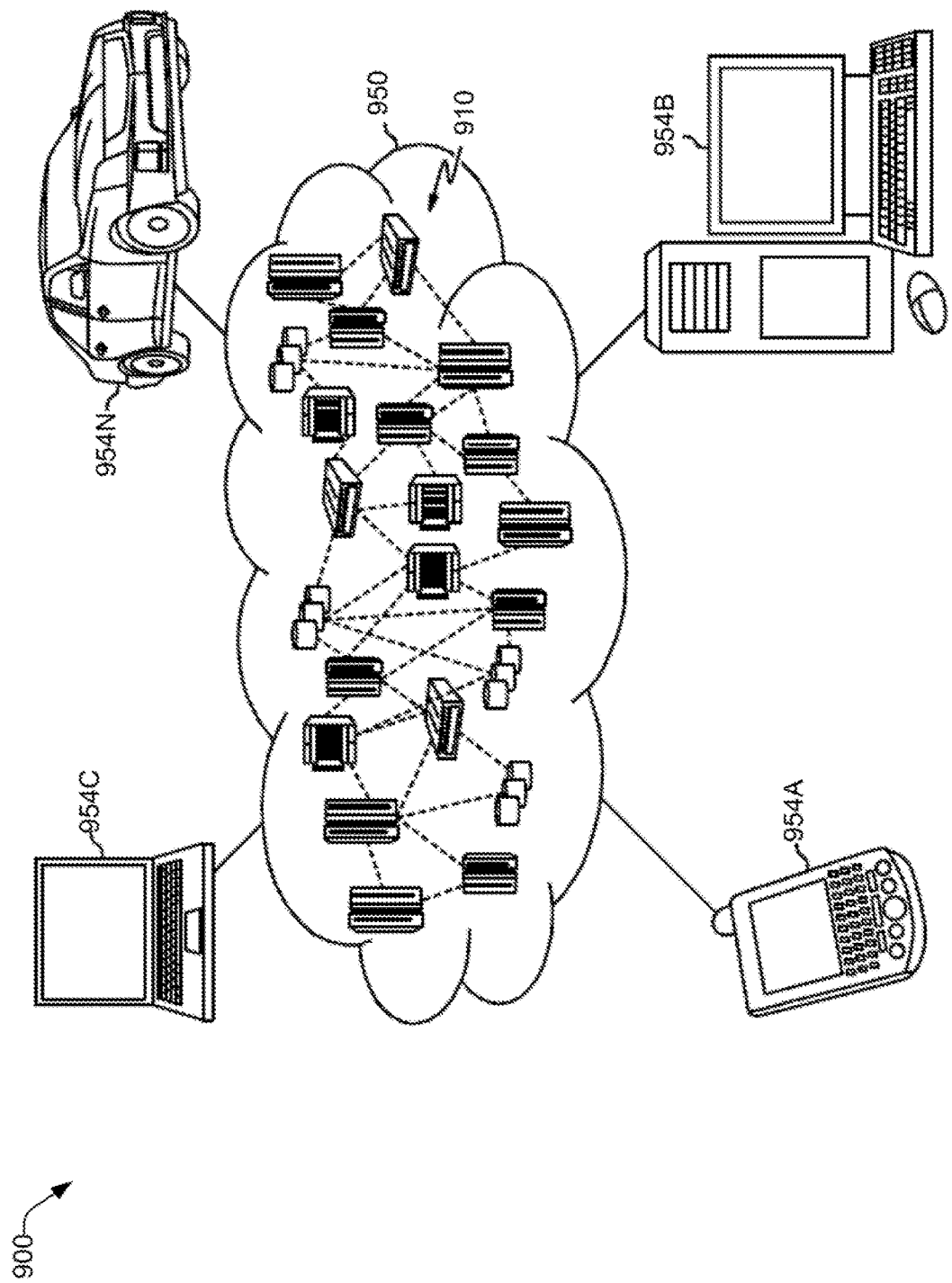
FIG. 9 depicts a cloud computing environment, consistent with an illustrative embodiment.

Referring now to FIG. 9, an illustrative cloud computing environment 900 is depicted. As shown, cloud computing environment 900 includes one or more cloud compute nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that compute nodes 910 and cloud computing environment 950 can communicate with any type of computerized device over any type of network and/or network addressable connection (e.g., using a web browser).

Figure 10:
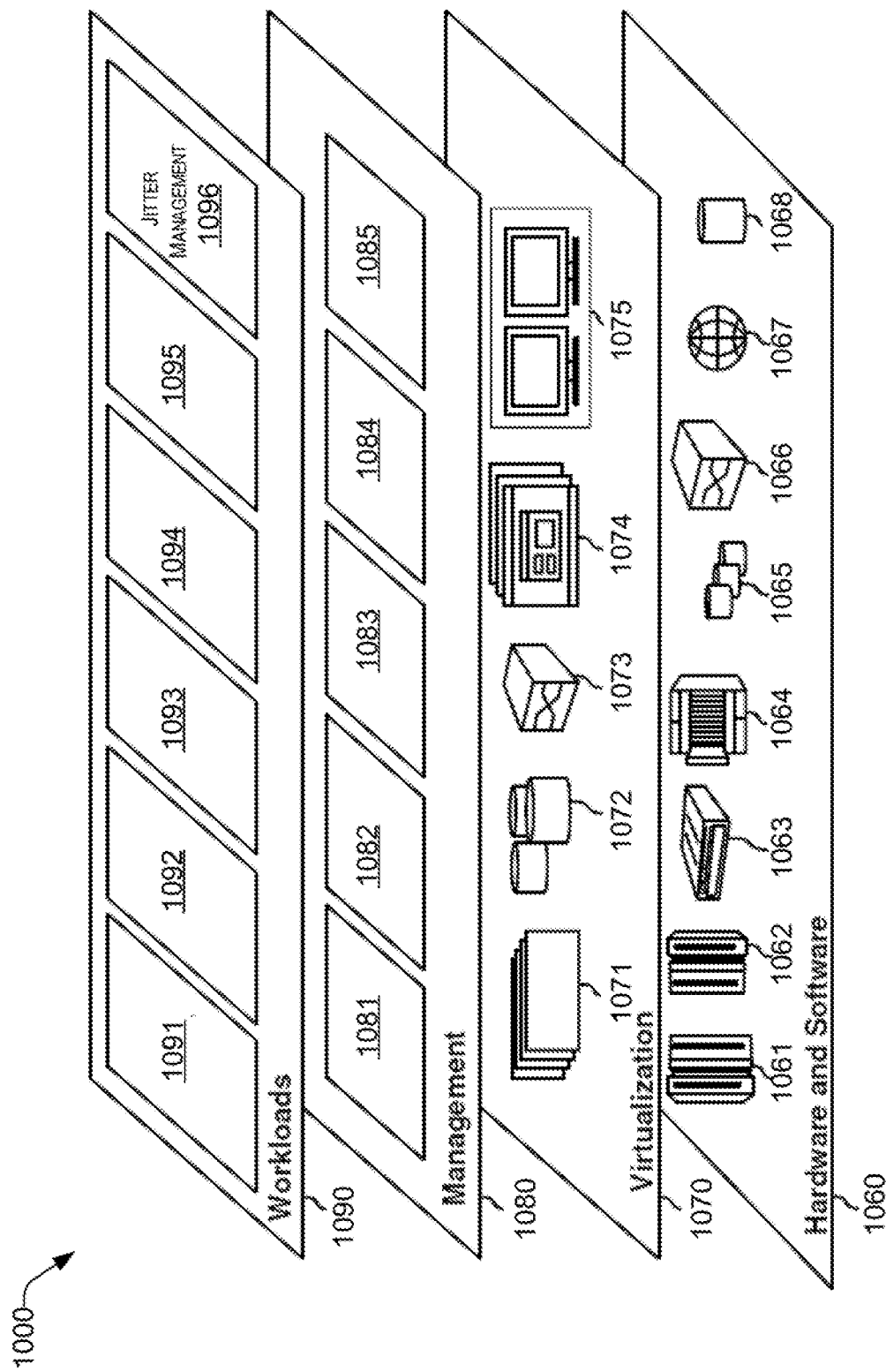
FIG. 10 depicts abstraction model layers, consistent with an illustrative embodiment.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the disclosure are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and managing OS jitter 1096, as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
a processor;
a network interface coupled to the processor to enable communication over a network;
a storage device coupled to the processor;
a jitter management engine code stored in the storage device, wherein an execution of the code by the processor configures the computing device to perform acts comprising, in an active phase:
receiving power consumption information for a first time period of a compute node of a plurality of compute nodes of a large-scale computing system, wherein the compute node is running a subject program;
determining a digital signature of a power spectrum of the compute node based on the power consumption information;
comparing the digital signature of the power spectrum to a baseline power spectrum of the compute node;
upon determining that the digital signature of the power spectrum varies beyond a threshold from the baseline power spectrum:
identifying the subject program as a source of incompatible operating system (OS) jitter; and
performing an OS jitter mitigation measure; and
upon determining that the digital signature of the power spectrum does not vary beyond the threshold from the baseline power spectrum, storing the digital signature of the power spectrum in a memory.

2. The computing device of claim 1, wherein the power consumption information for the first time period is a time series of power consumed at predetermined intervals at the compute node.

3. The computing device of claim 1, wherein performing the OS jitter mitigation measure comprises sending a notification to a system administrator of the large-scale computing system, indicating that an OS jitter of a compute node of the large-scale computing system has exceeded the predetermined threshold.

4. The computing device of claim 1, wherein the OS jitter mitigation measure comprises migrating a program running on the compute node that is adversely affected by the OS jitter to another compute node of the large-scale computing system.

5. The computing device of claim 1, wherein the OS jitter mitigation measure comprises migrating a program running on the compute node to another core of the compute node.

6. The computing device of claim 1, wherein the OS jitter mitigation measure comprises at least one of: (i) changing a daemon wake-up interval running on the compute node, or (ii) changing a synchronization interval of a program running on the compute node that is adversely affected by the OS jitter.

7. The computing device of claim 1:
wherein execution of the code by the processor further configures the computing device to perform acts comprising: upon determining that the digital signature of the power spectrum varies beyond a threshold from the baseline power spectrum, determining which compute node of the plurality of compute nodes has a digital signature of a power spectrum that is compatible with the subject program; and wherein the OS jitter mitigation measure comprises migrating the subject program to another compute node of the large-scale computing system.

8. The computing device of claim 1, wherein the OS jitter mitigation measure comprises disabling the subject program.

9. The computing device of claim 1, wherein execution of the code by the processor further configures the computing device to perform acts comprising: in a preliminary phase, for each of the plurality of compute nodes of the large-scale computing system:
    receiving a baseline power consumption information when the compute node is operating under a low or nominal load condition and when not running the subject program;
    determining a baseline digital signature of a power spectrum of the compute node based on the baseline power consumption information; and
    storing the baseline digital signature of the power spectrum of the compute node in the memory.

10. The computing device of claim 1, wherein the active phase is initiated by the subject program being introduced in the compute node of the large-scale computing system.

11. The computing device of claim 1, wherein the subject program is a middleware daemon.

12. The computing device of claim 1, wherein the OS jitter mitigation measure is determined by artificial intelligence (AI).

13. The computing device of claim 1, wherein the threshold from the baseline power spectrum is based on a difference in amplitude of a power spike between the baseline power spectrum and the signature of the power spectrum, at a common frequency.

14. The computing device of claim 1, wherein the threshold from the baseline power spectrum is based on a frequency shift of a power spike between the baseline power spectrum and the signature of the power spectrum.

15. A non-transitory computer readable storage medium tangibly embodying a computer readable program code having computer readable instructions that, when executed, causes a computer device to carry out a method of managing operating system (OS) jitter of a large-scale computing system having a plurality of compute nodes, the method comprising, in an active phase:
    receiving power consumption information for a first time period of a compute node of the plurality of compute nodes of the large-scale computing system, wherein the compute node is running a subject program;
    determining a digital signature of a power spectrum of the compute node based on the power consumption information;
    comparing the digital signature of the power spectrum to a baseline power spectrum of the compute node;
    upon determining that the digital signature of the power spectrum varies beyond a threshold from the baseline power spectrum:
        identifying the subject program as a source of incompatible operating system (OS) jitter; and
        performing an OS jitter mitigation measure; and
    upon determining that the digital signature of the power spectrum does not vary beyond the threshold from the baseline power spectrum, storing the digital signature of the power spectrum in a memory.

16. The non-transitory computer readable storage medium of claim 15, wherein the power consumption information for the first time period is a time series of power consumed at predetermined intervals at the compute node.

17. The non-transitory computer readable storage medium of claim 15, wherein performing the OS jitter mitigation measure comprises sending a notification to a system administrator of the large-scale computing system, indicating that an OS jitter of a compute node of the large-scale computing system has exceeded the predetermined threshold.

18. The non-transitory computer readable storage medium of claim 15, wherein the OS jitter mitigation measure comprises migrating a program running on the compute node that is adversely affected by the OS jitter to another compute node of the large-scale computing system.

19. The non-transitory computer readable storage medium of claim 15, the method further comprising:
    upon determining that the digital signature of the power spectrum varies beyond a threshold from the baseline power spectrum, determining which compute node of the plurality of compute nodes has a digital signature of a power spectrum that is compatible with the subject program; and
    wherein the OS jitter mitigation measure comprises migrating the subject program to another compute node of the large-scale computing system.

20. The non-transitory computer readable storage medium of claim 15, the method further comprising: in a preliminary phase, for each of the plurality of compute nodes of the large-scale computing system:
    receiving a baseline power consumption information when the compute node is operating under a low or nominal load condition and when not running the subject program;
    determining a baseline digital signature of a power spectrum of the compute node based on the baseline power consumption information; and
    storing the baseline digital signature of the power spectrum of the compute node in the memory.

\* \* \* \* \*